United States Patent [19]

Meier et al.

[11] Patent Number: 5,932,678
[45] Date of Patent: Aug. 3, 1999

[54] MIXTURES CONTAINING A) REACTION PRODUCTS OF ISOCYANATES AND NCO-REACTIVE SILANES AND B)CARBOSILANE DENDRIMERS, A PROCESS FOR PREPARING POWDER COATINGS FROM THE MIXTURES AND THEIR USE

[75] Inventors: Helmut-Martin Meier, Ratingen; Michael Mager, Leverkusen; Karsten Dierksen, Köln; Knud Reuter, Krefeld, all of Germany

[73] Assignee: Bayer AG, Leverkusen, Germany

[21] Appl. No.: 08/814,552

[22] Filed: Mar. 11, 1997

[30] Foreign Application Priority Data

Mar. 22, 1996 [DE] Germany .......................... 196 11 368

[51] Int. Cl.⁶ ................................................. C08G 77/16
[52] U.S. Cl. ................................. 528/28; 528/34; 528/35; 524/715; 524/359; 524/720; 524/106; 427/447
[58] Field of Search ................................. 528/28, 33, 34, 528/35; 524/715, 720, 106, 357; 427/387

[56] References Cited

U.S. PATENT DOCUMENTS

| | | | |
|---|---|---|---|
| 3,632,557 | 1/1972 | Brode et al. ........................... | 260/77.5 |
| 5,157,095 | 10/1992 | Smid ........................................ | 528/15 |
| 5,378,790 | 1/1995 | Michalczyk et al. ..................... | 528/35 |
| 5,548,051 | 8/1996 | Michalczyk et al. ..................... | 528/15 |
| 5,677,410 | 10/1997 | Mager et al. ............................. | 528/15 |

FOREIGN PATENT DOCUMENTS

| | | |
|---|---|---|
| 0 676 403 | 10/1995 | European Pat. Off. . |
| 0 743 313 | 11/1996 | European Pat. Off. . |
| 196 03 242 | 11/1996 | Germany . |
| WO 94/06807 | 3/1994 | WIPO . |
| WO 97/02304 | 1/1997 | WIPO . |

OTHER PUBLICATIONS

Orbit Abstract of EP 0 743 313 (Nov. 20, 1996).
Muzafarov et al., Organosilicon Dendrimers: Volume–Growing Polyallylcarbosilanes, Polymer Science, Bd. 35, Nr. 11, pp. 1575–1580, Nov. 1, 1993.
Orbit Abstract of WO 97/02304 (Jan. 23, 1997).
Orbit Abstract of DE 196 03 242 (Nov. 21, 1996).
Abstract of DE 195 17 839 showing patent family.

*Primary Examiner*—Robert Dawson
*Assistant Examiner*—Caixia Lu Rutt
*Attorney, Agent, or Firm*—Connolly & Hutz

[57] ABSTRACT

The present invention relates to mixtures, containing A) reaction products from isocyanates and NCO-reactive silanes and B) carbosilane dendrimers, a process for preparing powder coatings from the mixtures and their use.

16 Claims, No Drawings

MIXTURES CONTAINING A) REACTION PRODUCTS OF ISOCYANATES AND NCO-REACTIVE SILANES AND B) CARBOSILANE DENDRIMERS, A PROCESS FOR PREPARING POWDER COATINGS FROM THE MIXTURES AND THEIR USE

The present invention relates to mixtures containing A) reaction products of isocyanates and NCO-reactive silanes and B) carbosilane dendrimers, a process for preparing powder coatings from the mixtures and their use.

In the lacquer sector, silicone components are being used to a greatly increased extent because these lead to increased resistance to heat, UV light, solvents and chemicals as well as a higher resistance to scratching. Thus, alkoxysilanes which contain isocyanate groups have been used successfully in U.S. Pat. No. 3,632,557. However, a solvent is unavoidable for these lacquer systems. Because of the ecological advantages, the lacquer sector is making increasing use of solid systems, i.e. powder coatings. It has not been possible hitherto, however, to provide powder coatings based on silicone-containing binders.

The object of the present invention was, therefore, the provision of silicone-containing mixtures which can be used as powders, which have a melting point below 230° C., which remain free-flowing when stored and in particular which can be used as a coating or an adhesive.

Surprisingly, it has now been found that mixtures containing A) reaction products of isocyanates and NCO-reactive silanes and B) carbosilane dendrimers have these properties.

The invention therefore provides mixtures containing A) at least one reaction product of at least one isocyanate with at least one compound of the formula I $$Y—R^2—Si(R^3)_n(OR^4)_{3-n}$$

where
$Y=NHR^1$ or OH, preferably $NHR^1$, where $R^1$=H, $C_1$–$C_{18}$-alkyl, $C_5$–$C_8$-cycloalkyl, $C_6$–$C_{10}$-aryl or $C_7$–$C_{12}$-aralkyl, preferably H, $R^2$=$C_1$–$C_5$-alkylene $R^3$ and $R^4$=$C_1$–$C_{18}$-alkyl or alkoxyalkylene with up to 5 carbon atoms, and n=0, 1 or 2,
and B) at least one carbosilane dendrimer with condensation-crosslinking terminal groups.

The isocyanates are preferably mono, di and polyfunctional compounds such as e.g. phenyl isocyanate, 2,4-toluylene diisocyanate, 2,6-toluylene diisocyanate, 4,4'-diphenylmethane diisocyanate, their reaction products with low molecular weight polyols such as e.g. trimethylolpropane, diisocyanates with uretdione groups, based on 2,4- or 2,6-toluylene diisocyanate, 1-isocyanato-3,3,5-trimethyl-5-isocyanatomethyl-cyclohexane (IPDI), hexamethylene diisocyanate (HDI), 4,4'-diisocyanatodicyclohexylmethane or derivatives of these diisocyanates with biuret groups, isocyanurate groups, uretdione groups, urethane groups, oxadiazinetrione groups and/or allophanate groups or mixtures thereof.

Polyisocyanates based on HDI and/or IPDI, such as e.g. polyisocyanates containing uretdione, biuret or isocyanurate groups are particularly preferred.

In a quite specifically preferred embodiment of the present invention, the isocyanate is an isocyanurate based on hexamethylene diisocyanate, e.g. Desmodur®N 3300.

The NCO-reactive silane of the formula I is preferably an aminosilane, in particular 3-aminopropyl-triethoxysilane
$H_2N—CH_2CH_2CH_2—Si(OC_2H_5)_3$ and/or $H_2N—CH_2CH_2CH_2—Si(OCH_3)_3$ The reaction products A) according to the invention are preferably obtained by reaction of a compound containing an isocyanate group with primary or secondary aminosilanes or hydroxysilanes in accordance with U.S. Pat. No. 3,632,557 or EP-A 676 403.

Carbosilane dendrimers with condensation-crosslinking terminal groups B), in the context of the invention, are preferably compounds of the formula (II)

$$R_{4-i}Si[(CH_2)_nSiX_aR_{3-a}]_i$$

where n=2–10, a=1, 2, or 3, i=3 or 4 and R=optionally substituted $C_1$–$C_{18}$-alkyl and/or optionally substituted $C_6$–$C_{10}$-aryl groups, wherein n within the molecule may be identical or different, preferably identical, and
X=OH, $[(CH_2)_nSi(OH)R_2]$, $[(CH_2)_nSiR_{3-a}[(CH_2)_nSi(OH)R_2]_a]$ or $[(CH_2)_nSiR_{3-a}[(CH_2)_nSiR_{3-a}[(CH_2)_nSi(OH)R_2]_a]_a]$, with the proviso that if X=OH, a=1 and if X=$[(CH_2)_nSi(OH)R_2]$, $[(CH_2)_nSiR_{3-a}[(CH_2)_nSi(OH)R_2]_a]$ or $[(CH_2)_nSiR_{3-a}[(CH_2)_nSiR_{3-a}[(CH_2)_nSi(OH)R_2]_a]_a]$, a can have a value of 1 or 3.

The term substituted, in the context of the invention, covers all common substituents such as e.g. halogen, alkyl, amino groups, etc.

When the above factors are taken into consideration, the carbosilane dendrimers according to the invention correspond to the formulae (IIa–IId)

$$R_{4-i}Si[(CH_2)_nSi(OH)R_2]_i \qquad \text{or (IIa)}$$

$$R_{4-i}Si[(CH_2)_nSiR_{3-a}[(CH_2)_nSi(OH)R_2]_1]_i \qquad \text{or (IIb)}$$

$$R_{4-i}Si[(CH_2)_nSiR_{3-a}[(CH_2)_nSiR_{3-a}[(CH_2)_nSi(OH)R_2]_a]_a]_i \qquad \text{or (IIc)}$$

$$R_{4-i}Si[(CH_2)_nSiR_{3-a}[(CH_2)_nSiR_{3-a}[(CH_2)_nSiR_{3-a}[(CH_2)_nSi(OH)R_2]_a]_a]_a]_i; \qquad (IId)$$

In a preferred embodiment of the present invention, n=2.

Carbosilane dendrimers of the formulae $Si[(CH_2)_2Si(OH)(CH_3)_2]_4$ or $Si[(CH_2)_2Si[(CH_2)_2Si(OH)(CH_3)_2]_3]_4$ are particularly preferred.

In another variant of the present invention, the carbosilane dendrimers have hydrolysable and condensation-crosslinking terminal groups, like those described in e.g. WO 94/06 807, U.S. Pat. No. 5,378,790 or U.S. Pat. No. 5,548,051. The entire disclosures of these documents, including the U.S. patents, are expressly incorporated by reference in the present application.

Preferred carbosilane dendrimers with hydrolysable and condensation-crosslinking terminal groups B) are compounds of the formula (III)

$$R_{4-i}Si[(CH_2)_nSiX_aR_{3-a}]_i$$

where n=2–10, a and b, independently of each other=1, 2 or 3, i=3 or 4 and R and R'=independently of each other, optionally substituted $C_1$–$C_{18}$-alkyl and/or optionally substituted $C_6$–$C_{10}$-aryl groups, wherein n within the molecule may be identical or different, preferably identical and
X=OR', $[(CH_2)_nSi(OR')_bR_{3-b}]$, $[(CH_2)_nSiR_{3-a}[(CH_2)_nSi(OR')_bR_{3-b}]_a]$ or $[(CH_2)_nSiR_{3-a}[(CH_2)_nSiR_{3-a}[(CH_2)_nSi(OR')_bR_{3-b}]_a]_a]$.

These are hydrolysed by conventional methods before or during use in the mixtures according to the invention.

The term substituted, in the context of the invention, covers all common substituents such as e.g. halogen, alkyl, amino groups, etc.

The OR'-functional carbosilane dendrimers are preferably hydrolysed before or during addition to component A), optionally in the presence of a catalyst and/or solvent.

The carbosilane dendrimers used in the mixtures according to the invention are prepared in accordance with DE-A-19 517 839.4 or in accordance with WO 94/06 807, U.S. Pat. No. 5,378,790 or U.S. Pat. No. 5,548,051. The entire disclosures of these published documents or their U.S. counterparts are expressly incorporated by reference in the present application.

In a preferred embodiment, the mixture according to the invention contains, depending on its ultimate use, additives C) such as e.g. pigments, degassing agents such as e.g. benzoin and/or catalysts such as e.g. organic or inorganic acids or metallo-organic compounds such as e.g. tin soaps, flow control aids, light stabilisers such as e.g. sterically hindered amines (HALS), benztriazoles.

Pigments used as additives C) are then advantageously present in amounts of 0.1 to 100 wt. %, preferably up to 60 wt. %, and degassing agents, catalysts, flow controllers and/or light stabilisers are preferably present in amounts of 0.1 to 5 wt. %, with respect to the sum of the weights of A) and B).

When reacting isocyanates with NCO-reactive silanes, the molar ratio of isocyanate groups to $NH_2$, $NHR^1$ or OH groups in the reactive silane is preferably less than or equal to 1, more preferably from 0.1 to 1, in particular 1.

In mixtures according to the invention, the ratio by amount of reaction products from isocyanates and NCO-reactive silanes A) to carbosilane dendrimers B) is preferably 10 to 90 to 10, in particular 30 to 70 to 70 to 30.

The ratio of A) and B) to each other is characterised by the ratio of Si—$OR^4$ groups in component A) to Si—OH and/or SiOR' groups in component B), wherein the molar ratio $OR^4$/OH and/or SiOR' is preferably 0.1 to 10, in particular 0.8 to 5, quite specifically 1 to 2.

Mixtures according to the invention may be prepared by mixing A) with B) and optionally C).

This mixture may then be milled manually or preferably with suitable mills.

Preparation of the mixture of A) and B) and optionally C) is preferably performed by homogenising the components in an extruder and then melting and milling the solidified melt.

The present invention also provides a process for preparing powder coatings based on mixtures according to the invention, in which the individual components A), B) and optionally C) are melted, thoroughly mixed in the liquid state and then cooled down.

The present invention also provides use of a mixture according to the invention as a powder coating and as an adhesive.

When used as a powder coating, components A) and B) are applied as a powder to a surface to be coated, e.g. with an electrostatic spraying device, and then cured to form a film at elevated temperature, preferably at 120° C. to 220° C. Another method of working comprises melting the mixture of A) and B) at 120° C. and then painting the melt onto the substrate with a suitable coating device and curing at 120° C. to 220° C.

The hardening points may be e.g. 120° C. to 220° C., preferably 140° C. to 180° C.

The hardening times may vary, depending on the temperature, and are e.g. from 10 minutes to 180 minutes.

The coatings obtained are solvent-resistant, scratch-resistant and non-pigmented transparent and exhibit very good adhesive behaviour on a variety of surfaces such as e.g. glass, metals and plastic materials (polycarbonates).

The mixture of components A) and B) and optionally C) is also exceptionally suitable for sticking surfaces together. For this purpose, two surfaces are coated with the molten mixture of A) and B) and optionally C), preferably at 120° C., and then the coated surfaces are brought together. After curing under the conditions mentioned above, the surfaces are firmly glued to each other.

The following examples serve to explain the invention.
The invention is not, however, restricted to the examples.

Experimental Section

Preparation of Component A1

Preliminary Comment

The $Si[(CH_2)_2SiClMe_2]_4$ used may be obtained by hydrosilylation of tetravinylsilane with $HSiCl\,Me_2$ in accordance with DE-A-19 517 839 in which 5 drops of the platinum catalyst were added at room temperature to a mixture of 5 g (36.7 mmol) of tetravinylsilane, 20.8 g (220.1 mmol) of chlorodimethylsilane and 20 ml of thf. The whole was stirred initially for 30 min at room temperature and heated to 45° C. to 50° C. A violent exothermal reaction occurred after a few minutes, the heating bath having to be removed in certain circumstances. When the temperature dropped, heating to 45° C. to 50° C. for a further 2 h took place. After cooling to room temperature stirring took place for a further 20 h and all volatile components were removed under vacuum. The product was obtained as a colourless wax.

19.5 g of Desmodur ®N3300 (NCO-equivalent 195 g/mol) were initially introduced at room temperature, under an atmosphere of nitrogen. 22.1 g of 3-aminopropyl-triethoxysilane (0.1 mol) were then added dropwise over the course of 10 minutes, with stirring. The reaction mixture was heated at 100° C. for 3 hours using the heat of reaction. After cooling down, a pale yellow, solid residue was isolated and this was crushed to produce a powder.

Softening point: ca. 100° C. Si content: 6.65% (theoretical 6.7%) IR: no NCO groups detectable Yield: 41 g Synthesis of $Si[(CH_2)_2Si(OH)Me_2]_4$, Component B1

A solution of 10.0 g (19.5 mmol) of $Si[(CH_2)_2SiClMe_2]_4$ in 20 ml of diethyl ether were added dropwise over the course of 30 minutes to 8.5 g (84.0 mmol) of triethylamine and 1.62 g (90.0 mmol) of water in 300 ml of diethyl ether. The triethylamine hydrochloride formed was then produced as a white precipitate. After completion of the addition procedure, stirring was continued for a further 1 hour and the solid was filtered off. Solvent was removed from the filtrate under vacuum. The colourless solid obtained in this way was dissolved in THF and dropped slowly into 500 ml of hexane, with vigourous stirring. The product appeared as a fine, white precipitate which, after filtering off and washing once with hexane, does not require further purification.

A stable solid was obtained. Melting point 144° C. Elemental analysis:

|        | C      | H      | O      | Si              |
|--------|--------|--------|--------|-----------------|
| Calc.: | 43.58% | 10.06% | 14.51% | 31.85%          |
| Found: | 43.6%  | 10.1%  | 14.2%  | 32.1% (Diff.)   |

$C_{16}H_{44}O_4Si_5$ M=440.951 g/mol NMR: (DMSO-$d_6$) $^1$H: δ=0.0 ppm (s, 6H, $SiCH_3$); 0.39 ppm (m, 4H, $Si(CH_2)_2Si$); 5.21 ppm (s, 1H, SiOH). $^{13}C\{^1H\}$: δ=−0.63 ppm (s, $SiCH_3$); 1.93 ppm (s, $Si(CH_2)_4$); 9.77 ppm (s, $Si(OH)CH_2$). $^{29}Si\{^1H\}$: δ=14.26 ppm (s, $Si(CH_2)_4$); 16.33 ppm (s, SiOH).

EXAMPLE 1

5 g of component Al (=0.036 mol=OC$_2$H$_5$ groups) and 3.94 g of component Bl (=0.036 mol OH groups) were finely milled and melted at 100 to 120° C. and then applied to a 0.6 mm thick metal sheet in a 15 μm thick layer. The coating was cured for 1 hour at 160° C.

| Properties: | |
| --- | --- |
| Cross-hatch adhesion test (ISO 2409): | 0 |
| Erichsen depth (ISO 1520): | 9 mm |
| Impact (ASTM D 2794-93): | 80 inch. lb |

EXAMPLE 2

The mixture from example 1 was applied to glass in a 15 μm thick layer, in the same way, and cured for I hour at 160° C.

| Properties: | |
| --- | --- |
| Cross-hatch adhesion test (ISO 2409): | 0 |
| Pendulum hardness: (DIN 53 157) | 160 sec |

EXAMPLE 3

The mixture from example 1 was applied in a 15 μm thick layer to a polycarbonate surface and cured for 1 hour at 160° C.

| Properties: | |
| --- | --- |
| Cross-hatch adhesion test (ISO 2409): | 0 |
| Trickling sand test (haze according to ASTM D 1003): | 5.3% |
| Comparison, uncoated polycarbonate surface: | 35% |

EXAMPLE 4

The mixture from example 1 was applied to two aluminium surfaces in a 15 μm thick layer. The two surfaces were brought together and maintained at a constant temperature of 160° C. for 1 hour. After cooling, the two aluminium sections were firmly glued together.

What is claimed is:

1. Mixtures, comprising A) at least one reaction product from at least one isocyanate and at least one NCO-reactive silane of the formula I

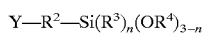

where

Y=NHR$^1$or OH, where

R$^1$=H, C$_1$–C$_{18}$-alkyl, C$_5$–C$_8$-cycloalkyl, C$_6$–C$_{10}$-aryl or C$_7$–C$_{12}$-aralkyl, R$^2$=C$_1$–C$_5$-alkylene R$^3$ and R$^4$=C$_1$–C$_{18}$-alkyl or alkoxyalkylene with up to 5 carbon atoms, and n=0, 1 or 2, and B) at least one carbosilane dendrimer with condensation-crosslinking terminal groups.

2. Mixtures according to claim 1, characterized in that the at least one isocyanate is a polyisocyanate based on hexamethylene diisocyanate and/or 1-isocyanato-3,3,5-trimethyl-5-isocyanatomethyl-cyclohexane.

3. Mixtures according to claim 1, characterized in that the at least one NCO-reactive silane is NH$_2$—CH$_2$CH$_2$CH$_2$—Si(OC$_2$H$_5$)$_3$ and/or NH$_2$—CH$_2$CH$_2$CH$_2$—Si(OCH$_3$)$_3$.

4. Mixtures according to claim 1, characterized in that the at least one carbosilane dendrimer with condensation-crosslinking terminal groups are compounds of the formula (II)

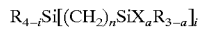

where n=2–10, a=1, 2 or 3 i=3 or 4 and R=optionally substituted C$_1$–C$_{18}$-alkyl and/or optionally substituted C$_6$–C$_{10}$-aryl groups, wherein n within the molecule is identical or different, and X=OH, [(CH$_2$)$_n$Si(OH)R$_2$], [(CH$_2$)$_n$SiR$_{3-a}$[(CH$_2$)$_n$Si(OH)R$_2$]$_a$] or [(CH$_2$)$_n$SiR$_{3-a}$[(CH$_2$)$_n$SiR$_{3-a}$[(CH$_2$)$_n$Si(OH)R$_2$]$_a$]$_a$], with the proviso that if X=OH, a=1 and if X=[(CH$_2$)$_n$Si(OH)R$_2$], [(CH$_2$)$_n$SiR$_{3-a}$[(CH$_2$)$_n$Si(OH)R$_2$]a] or [(CH$_2$)$_n$SiR$_{3-a}$[(CH$_2$)$_n$SiR$_{3-a}$[(CH$_2$)$_n$Si(OH)R$_2$]$_a$]$_a$], a is 1 or 3.

5. Mixtures according to claim 1, characterized in that the at least one carbosilane dendrimer is Si[(CH$_2$)$_2$Si(OH)(CH$_3$)$_2$]$_4$ or —Si[(CH$_2$)$_2$Si[(CH$_2$)$_2$Si(OH)(CH$_3$)$_2$]$_3$]$_4$—.

6. Mixtures according to claim 1, characeteized in that the at least one carbosilane dendrimer with condensation-crosslinking terminal groups B) is selected from compounds of the formula (m)

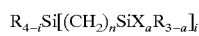

where n=2–10, a and b independently of each other =1, 2 or 3, i=3 or 4 and R and R', independently of each other; =optionally substituted C$_1$–C$_{18}$-alkyl and/or optionally substituted C$_6$–C$_{10}$-aryl groups, wherein n within the molecule may be identical or different and —[(CH$_2$)$_n$SiR$_{3-a}$[(CH$_2$)$_n$Si(OR')$_b$R$_{3-b}$]$_a$] or [(CH$_2$)$_n$SiR$_{3-a}$[(CH$_2$)$_n$SiR$_{3-a}$[(CH$_2$)$_n$Si(OR')$_b$R$_{3-b}$]$_a$]$_a$]—.

which are hydrolysed before or during addition to component A).

7. Mixtures according to claim 1, characterized in that they additionally contain additives C) selected from the group consisting of pigments, degassing agents, flow control agents, light stabilisers and catalysts.

8. Mixtures according to claim 1, characterized in that the ratio by amounts of A) to B) is 10:90 to 90:10.

9. A process for preparing powder coating mixtures comprising mixtures according to claim 1, characterized in that the individual components A), B) and optionally C) are melted, very thoroughly mixed as a liquid and then cooled.

10. A method of using the mixtures according to claim 1, wherein said mixtures are applied to a substrate as a powder coating.

11. A method of using the mixtures according to claim 1, wherein said mixtures are applied to a surface of a substrate as an adhesive.

12. Mixtures according to claim 7, wherein said additives C) are pigments that are present in amounts of from 0.1 to 100 wt. %, with respect to the sum of the weights of A) and B).

13. Mixtures according to claim 7, wherein said additives C) are selected from the group consisting of degassing agents, catalysts, flow controllers and light stabilisers, each of said additives being present in amounts of from 0.1 to 5 wt. %, with respect to the sum of the weights of A) and B).

14. A process according to claim 9, wherein the individual components A), B) and optionally C) are melted at a temperature of about 120° C.

15. Mixtures, comprising A) at least one reaction product from at least one isocyanate and at least one NCO-reactive silane of the formula I $$Y-R^2-Si(R^3)_n(OR^4)_{3-n},$$

where $Y=NHR^1$ or OH, where $R^1$=H, $C_1$–$C_{18}$-alkyl, $C_5$–$C_8$-cycloalkyl, $C_6$–$C_{10}$-aryl or $C_7$–$C_{12}$-aralkyl, $R^2$=$C_1$–$C_5$-alkylene $R^3$ and $R^4$=$C_1$–$C_{18}$-alkyl, and n=0, 1 or 2, and B) at least one carbosilane dendrimer with condensation-crosslinking terminal groups, wherein said at least one carbosilane dendrimer with condensation-crosslinking terminal groups is at least one compound of the formula (II)

$$R_{4-i}Si[(CH_2)_nSiX_aR_{3-a}]_i$$

where n=2–10, a=1, 2 or 3, i=3 or 4 and R=optionally substituted $C_1$–$C_{18}$-alkyl and/or optionally substituted $C_6$–$C_{10}$-aryl groups, wherein n within the molecule is identical or different, and X=OH, [$(CH_2)_n$Si(OH)$R_2$], [$(CH_2)_n$SiR$_{3-a}$[$(CH_2)_n$Si(OH)$R_2$]$_a$] or [$(CH_2)_n$SiR$_{3-a}$[$(CH_2)_n$SiR$_{3-a}$[$(CH_2)_n$Si(OH)$R_2$]$_a$]$_a$], with the proviso that if X=OH, a=1 and if X=[$(CH_2)_n$Si(OH)$R_2$], [$(CH_2)_n$SiR$_{3-a}$[$(CH_2)_n$Si(OH)$R_2$]$_a$] or [$(CH_2)_n$SiR$_{3-a}$[$(CH_2)_n$SiR$_{3-a}$[$(CH_2)_n$Si(OH)$R_2$]$_a$]$_a$], a is 1 or 3.

16. Mixtures, comprising A) at least one reaction product from at least one isocyanate and at least one NCO-reactive silane of the formula I $$Y-R^2-Si(R^3)_n(OR^4)_{3-n}$$

where $Y=NHR^1$ or OH, where $R^1$=H, $C_1$–$C_{18}$-alkyl, $C_5$–$C_8$-cycloalkyl, $C_6$–$C_{10}$-aryl or $C_7$–$C_{12}$-aralkyl, $R^2$=$C_1$–$C_5$-alkylene $R^3$ and $R^4$=$C_1$–$C_{18}$-alkyl, and n=0, 1 or 2, and B) at least one carbosilane dendrimer with condensation-crosslinking terminal groups, wherein said at least one carbosilane dendrimer with condensation-crosslinking terminal groups is at least one compound of the formula (II)

$$R_{4-i}Si[(CH_2)_nSiX_aR_{3-a}]_i$$

where n=2–10; and

X=OR', [$(CH_2)_n$Si(OR')$_b$R$_{3-b}$], [$(CH_2)_n$SiR$_{3-a}$[$(CH_2)_n$Si(OR')$_b$R$_{3-b}$]$_a$] or [$(CH_2)_n$SiR$_{3-a}$[$(CH_2)_n$SiR$_{3-a}$[$(CH_2)_n$Si(OR')$_b$R$_{3-b}$]$_a$]$_a$], wherein a and b, independently of each other,=1, 2 or 3, i=3 or 4, R and R', independently of each other,= optionally substituted $C_1$–$C_{18}$-alkyl and/or optionally substituted C6–C10-aryl groups, and n within the molecule is identical or different; which are hydrolysed before or during addition to component A.

* * * * *

UNITED STATES PATENT AND TRADEMARK OFFICE
CERTIFICATE OF CORRECTION

PATENT NO. : 5,932,678
DATED : August 3, 1999
INVENTOR(S) : Helmut-Martin Meier, et. al.

It is certified that error appears in the above-identified patent and that said Letters Patent is hereby corrected as shown below:

On the cover page, in section [56], References Cited, U.S. PATENT DOCUMENTS, after U.S. Patent 3,632,557 the following should be added:

-- 4,508,889  4/1985     Noren et al...................528/28

4,687,533  8/1987     Rizk et al....................156/307.3 --.

In column 6, in line 28 (last line of claim 5),

"—Si[(CH$_2$)$_2$Si[(CH$_2$)$_2$Si(OH)(CH$_3$)$_2$]$_3$]$_4$—" should be changed to --Si[(CH$_2$)$_2$Si[(CH$_2$)$_2$Si(OH)(CH$_3$)$_2$]$_3$]$_4$--.

In column 6, in line 29 (claim 6), "characeteized" should be - -characterized--.

In column 6, in line 32 (claim 6), "(m)" should be - - (III) - -.

UNITED STATES PATENT AND TRADEMARK OFFICE
CERTIFICATE OF CORRECTION

PATENT NO.   : 5,932,678
DATED        : August 3, 1999
INVENTOR(S)  : Helmut-Martin Meier, et. al.

It is certified that error appears in the above-identified patent and that said Letters Patent is hereby corrected as shown below:

In column 6, in line 41 (claim 6), "—$[(CH_2)_n SiR_{3-a}[(CH_2)_n Si(OR')_b R_{3-b}]_a]$" should be:

-- $X = OR'$, $[(CH_2)_n Si(OR')_b R_{3-b}]$, $[(CH_2)_n SiR_{3-a}[(CH_2)_n Si(OR')_b R_{3-b}]_a]$ --.

In column 6, line 43 (claim 6), "$Si(OR')_b R_{3-b}]_a]_a$ —" should be --$Si(OR')_b R_{3-b}]_a]_a]$ --.

In column 8, in line 23 (claim 16), replace "$R_{4-i} Si[(CH_2)_n SiX_a R_{3-1}]_i$" with --$R_{4-i} Si[(CH_2)_n SiX_a R_{3-a}]_i$--.

Signed and Sealed this

Third Day of October, 2000

*Attest:*

Q. TODD DICKINSON

*Attesting Officer*       *Director of Patents and Trademarks*